US007944814B2

(12) United States Patent
Nissan et al.

(10) Patent No.: US 7,944,814 B2
(45) Date of Patent: May 17, 2011

(54) SWITCHING BETWEEN SECURED MEDIA DEVICES

(75) Inventors: Yuval Nissan, Modi'in (IL); Ofer Idan, Holon (IL)

(73) Assignee: AudioCodes Ltd, Lod (IL)

( * ) Notice: Subject to any disclaimer, the term of this patent is extended or adjusted under 35 U.S.C. 154(b) by 1008 days.

(21) Appl. No.: 11/429,931

(22) Filed: May 8, 2006

(65) Prior Publication Data

US 2007/0260870 A1 Nov. 8, 2007

(51) Int. Cl.
*G06F 11/00* (2006.01)
(52) U.S. Cl. .......... 370/220; 370/216; 370/219; 714/12; 714/13
(58) Field of Classification Search .................. 370/219, 370/220
See application file for complete search history.

(56) References Cited

U.S. PATENT DOCUMENTS

| | | | |
|---|---|---|---|
| 6,966,003 B1 | 11/2005 | Joseph et al. | |
| 7,529,898 B2* | 5/2009 | Nguyen et al. | 711/162 |
| 2005/0102497 A1* | 5/2005 | Buer | 713/150 |

FOREIGN PATENT DOCUMENTS

WO  WO 02/080431  10/2002

OTHER PUBLICATIONS

Baugher et al., The Secure Real-time Transport Protocol (SRTP), IETF RFC 3711, Mar. 2004.*
Schulzrinne et al., "RTP: A Transport Protocol for Real-time Applications", IETF RFC 3550, Jul. 2003.*
"SSLACC: A Clustered SSL Accelerator", Rescorla E. et al., Aug. 2001, pp. 1-18.

"Hot Swap-Transparent Server Failover for Linux", Burton-Krahn N., Sixteenth Systems Administration Conference, Nov. 3, 2002-Nov. 8, 2002, pp. 205-212.
European Search Report 07107545.1, Sep. 12, 2007 (date of mailing).
Requests for Comments (RFC's) 2401-2412 by S. Kent et al., Nov. 1998.
"Using ESP to Prevent Replay Attacks" by Brien M. Posey, MCSE, 2002 Posey Enterprises, article as published on the internet: http://www.brienposey.com/kb/using_esp_to_prevent_replay_attacks.asp.

(Continued)

*Primary Examiner* — Huy D Vu
*Assistant Examiner* — Maria Sekul
(74) *Attorney, Agent, or Firm* — Eitan Mehulal Law Group

(57) ABSTRACT

A system, method and apparatus for communication is provided which includes maintaining a primary and a secondary network media devices at substantially similar encryption state, wherein the secondary network media device is a redundant network media device. Similar encryption state may be maintained by copying reception and transmission switchover parameters from the primary network media device to the redundant network media device, at least once per $2^X$ packets, and preferably every $2^{13}$ packets that are either transmitted by, or received at, the primary network media device. The redundant network media device may receive packets by utilizing copied reception switchover parameters and transmit packets by estimating transmission switchover parameters based on copied transmission switchover parameters. The reception and transmission switchover parameters may be associated with Secure Real-time Transport Protocol or with Packet-Cable protocol. A communication system is also provided, which utilizes the communication method. The communication system may include several primary network media devices and a central network device to which switchover parameters may be copied from each primary network media device, and from which switchover parameters associated with a failing primary network media device may be copied to the redundant network media device.

44 Claims, 3 Drawing Sheets

OTHER PUBLICATIONS

"The Longest short IP Sec Paper", by Walberts, Jan. 10, 2005, article as published on the internet: www.linuxexposed.com/index.php?option=com_content&task=view&id=109&Itemid =48.

"How Secure is VoIP?" by Ahmar Ghaffar, Nov. 2004, article as published on the internet: http://www.tmcnet.com/voip/1104/FeatureSecurity.htm.

* cited by examiner

SWITCHING BETWEEN SECURED MEDIA DEVICES

FIELD OF DISCLOSURE

The present disclosure generally relates to the field of computer networks and network security. More specifically, the present disclosure relates to system, apparatus and method for switching between network media devices.

BACKGROUND

With the proliferation of the Internet and the continuing development in the multimedia field, most of the voice and video data communications are done today using packet switched networks such as the Internet, which utilize Internet Protocol (IP) standards. IP-enabled devices designed for transferring voice and video data over the Internet have become very popular.

Hot-Swap

An important concern of a communication system such as the Internet is its High Availability (HA). That is, network devices are required be operate, on the average, at least 99.999% of the time, for rendering the communication system reliable. A communication system that fails to meet that requirement is often considered unreliable. HA is ensured by allowing a malfunctioning active (primary) network device, which, until the failing instant rendered a service to a network user(s), to be replaced with a back-up, or redundancy, device for continuing to provide the service previously provided by the failing device. Replacing a malfunctioning device with a back-up, or redundant, device is a feature known in the field as "hot swap", also referred to as "fail over", "switch over" and "switchover".

Switchover generally refers to the transfer of control from an active device to a redundant device. Switchover typically involves sending (directly or indirectly) communication parameters (switchover parameters) associated with an active service-rendering device to a redundant device. A successful switchover means transfer of the control from the active device to the redundant device in a way to obviate the need to break up communication and then renegotiating again with the user to whom service is rendered, while the redundant device resumes control over the communication.

Switching over between a primary VoIP network device to a redundant VoIP network device (which backs up the primary network device) when a non-secure communication is involved is relatively simple because, in this case, switching over involves copying, from a primary network device to a redundant network device serving as a backup device for the primary network device, relatively non-challenging communication parameters. By "non-challenging" is meant static parameters, or parameters that do not substantially change during an entire communication session with a user (a remote network device), though they may change per communication session, where a communication session typically involves traveling of thousands of data packets in both directions. Exemplary communication parameters that are copied from a primary network device to a back-up network device are IP addresses, UDP (User Datagram Protocol) ports, frame size, Encoder and decoder types.

Performing switchover between network devices when secured data is involved is not trivial because of the security features involved. For example, security features include use of sequence numbers and/or timestamps that are uniquely assigned to the outgoing packets, encryption/decryption and authentication schemes, and measures useful for replay protection. Therefore, whenever control is transferred from a primary device to a redundant device, there is an additional requirement (comparing to the requirements for switching over in non-secure communication) to ensure transparent switching over; data relating to security features have to be copied from the primary/active device to the redundant device to ensure successful switchover. As a general rule, the more complex the (security) features involved in a data communication, the less trivial switching over becomes.

The difficulty involved in copying security-related data lies in that security-related data includes dynamic parameters, as opposed to the static parameters used in non-secure switchover(s). By "dynamic parameter" is meant a parameter whose value changes per packet in a given communication session, usually for uniquely characterizing each packet within a packet stream. Dynamic parameters are, for example, the time stamp (TimeStamp), which is the relative time at which the packet is generated, and the Sequence number (SEQ), which is a serial number assigned to a packet, SRTP rollover counter (ROC) and SRTP RTCP index.

IP protocol does not inherently provide security capabilities. Sometimes, data, and audiovisual related data in particular, traversing a data network may include personal and confidential information. Therefore, and since secure transfer of data (over any type of data network) is of concern, it may be desirable to utilize security features, such as authentication and encryption, to protect any personal and confidential information from being intercepted by unauthorized users. One suite of protocols for implementing such security, generally known as IP security (IPsec or IPSEC), has been defined by the Internet Engineering Task Force (IETF). IPSEC is described more fully in Requests For Comments (RFCs) 2401-2412 (by S. Kent et al., November 1998), the content of which is incorporated by reference herein in its entirety. A newer protocol, known as Security Real-Time Transport Protocol (SRTP), has also been defined by the IETF for providing security tailored for RTP protocol, which is the protocol used for media transport over VoIP networks. Both security suits (IPSEC and SRTP) provide protection against replay attacks, as is described more fully, for example in "Using ESP to Prevent Replay Attacks" (Brien M. Posey, MCSE, 2002 Posey Enterprises), "The longest short IP Sec Paper" (Walberts, 10 Jan. 2005), and in "How Secure Is VoIP?" (Ahmar Ghaffar, November 2004).

Replay Attack and Protection

A replay attack is a form of network attack in which a valid data transmission is maliciously or fraudulently repeated or delayed. This is carried out either by the originator or by an adversary who intercepts or copies the data and retransmits it, possibly as part of a masquerade attack. Replay prevention means are, therefore, used to prevent non-authorized network devices from copying and "replaying" packets exchanged by the two network devices. Replay prevention is described more fully in RFCs 2402 and 2406 (by S Kent et al., November 1998), the entire content of which is incorporated herein by reference.

OSI

OSI (Open Systems Interconnection) model is a layered abstract description for communications and computer network protocol design, developed as part of the Open Systems Interconnection initiative It is also called the OSI 7-layer model. Briefly, layer 1 is the Physical layer; layer 2 is the Data Link layer; layer 3 is the Network layer. The best known example of a layer 3 protocol is the Internet Protocol (IP); layer 4 is the Transport layer. The best known example of a layer 4 protocol is the Transmission Control Protocol (TCP)

and User Datagram Protocol (UDP); layer 5 is the Session layer; layer 6 is the Presentation layer; and layer 7 is the Application layer.

IPSEC

Since the IP protocol does not inherently provide any security capabilities, IP security (Ipsec or IPSEC) was introduced to provide security services such as: (1) Encrypting traffic (so it can not be read in its transmission), (2) Integrity validation (hence ensuring traffic has not been modified along its path), (3) Authenticating the Peers (hence both ends are sure they are communicating with a trusted entity the traffic is intended for), and (4) Anti-Replay (hence protect against session replay).

Generally, IPSEC is a standard for securing Internet Protocol (IP) communications by encrypting and/or authenticating all IP packets. IPSEC provides security at the network layer (layer 3 of the OSI model), which makes IPSEC relatively flexible, as it call be used for protecting both TCP and UDP based protocols, but increases its complexity and processing overhead because IPSEC cannot rely on TCP (layer 4 of the OSI model) to manage reliability and fragmentation. IPSEC is a set of cryptographic protocols used for securing packet flows and communication key(s) exchange. There are two cryptographic protocols used for securing packet flows: (1) Encapsulating Security Payload (ESP), which provides authentication, data confidentiality and message integrity, and (2) Authentication Header (AH), which provides authentication and message integrity, but does not offer confidentiality. Originally, AH was only used for integrity and ESP was used only for encryption; authentication functionality was added subsequently to ESP. Currently, only one key exchange protocol is defined, the IKE (Internet Key Exchange) protocol.

In IPSEC, a Security Association (SA) describes a unidirectional secured flow of data between two network devices such as gateways. SAs are usually automatically established on demand using the IKE, but some implementations of IPSEC permits manual establishment of SAs. A SA is defined by a destination address, a Security Parameter Index (SPI) and a security protocol. SPI identifies the security parameters in combination with IP address. IPSEC protocols are defined by RFCs 2401-2412. In order to establish a secure communication between two network devices using IPSEC, which is used in the network layer (layer 3) of the OSI model, a security association (SA) may be negotiated and set up between the two network devices involved. SA typically includes use of information such as key lifetime, encryption algorithm, authentication algorithm, and so on SAs are more fully described in RFC 2409, the content of which is incorporated herein by reference. In addition to establishing an SA, the two network devices may enable replay prevention to enhance security.

RTP

RTP (Real-time Transport Protocol) protocols operate at the Session layer (layer 5 of the OSI model). RTP is defined in RFC 3550 (which obsoletes RFC 1889). RFC 3551 (which obsoletes RFC 1890) defines a specific profile for Audio and Video Conferences with Minimal Control. RFC 3711, the entire content of which is incorporated herein by reference, defines the Secure Real-time Transport Protocol (SRTP) profile (actually an extension to RTP Profile for Audio and Video Conferences) which can be used (optionally) to provide confidentiality, message authentication, and replay protection for audio and video streams being delivered.

According to RFC 3550, the entire content of which is incorporated herein by reference, the services provided by RTP include: (1) Payload-type identification; (2) Sequence numbering, which is a monotonically increasing number assigned by a transmitter to a packet before it transmission; (3) Time stamping, which refers to the assignment of generation time to each transmitted packet; and (5) Delivery monitoring (RTCP).

Since RTP is designed to deal with voice and video packets and, therefore, timing aspects of packets are of concern (to allow packets' reordering and to avoid unacceptable delays and jitter), protocols associated with RTP deliver the necessary data to the application to make sure it can put the received packets in the correct order. Also, RTCP provides information about reception quality (through intermittent transmission of RTCP packets), which the application can use to make local (temporal and other) adjustments. For example, if congestion is forming, the application can decide to lower the data rate

SRTP

SRTP defines a profile of RTP, which is intended to provide encryption, message authentication and integrity, and replay protection to the RTP data in both unicast and multicast applications. SRTP facilitates high throughput, and it also seems to provide a suitable protection in a heterogeneous environment that is consisted of both wired and wireless communication network elements. Generally, SRTP intercepts RTP packets and then forwards, per intercepted RTP packet, an equivalent, or associated, SRTP packet on the sending (transmitting) side. SRTP also intercepts SRTP packets and forwards an equivalent RTP packet up the stack in the receiving side. The relationships between secure RTCP (SRTCP) and RTCP are similar to the relationships between SRTP and RTP; namely, SRTCP provides similar security services to RTCP. Using SRTCP message authentication is mandatory, for example for protecting the RTCP fields to keep track of the stream membership, providing feedback data to RTP senders, and for maintaining the packet sequence counters.

Security protocols such as SRTP typically include a feature known as replay protection. According to RFC 3711, a packet is said to be "replayed", or a "replay attack" occurs when the packet is stored by an adversary, and then re-injected by the adversary into the data network from which it was intercepted. RFC 3711, the SRTP protocol utilizes a replay list as means for protecting a receiving device from replay attacks. The receiving device has a replay list that contains indices of all of the packets it receives, and uses a "sliding window" for distinguishing between legitimate and non-legitimate (replayed) packets. The receiving device recognizes replayed packets by comparing the index of an incoming packet against the indices stored in the replay list. If the index of the received packet resides within the sliding window but the packet is received for the first time, then the packet is considered legitimate. This implies that whenever a switchover occurs, the index of the next received packet should be greater than the last one used/known.

PacketCable™

PacketCable™ is an organization started by Cable Television Laboratories, Inc. CableLabs®), and it is aimed at identifying, qualifying and supporting packet-based voice and video products over cable systems. CableLabs leads this initiative for rendering interface specifications interoperable in order to deliver real-time multimedia services over two-way cable networks. Built on top of the industry's DOCSIS™1.1 (Data Over Cable Service Interface Specifications) cable modem infrastructure, PacketCable networks use Internet Protocol (IP) to enable a wide range of multimedia services, such as IP telephony, multimedia conferencing, interactive gaming, and general multimedia applications. A DOCSIS 1.1 network with PacketCable extensions enables cable operators to deliver data and voice traffic efficiently using a single high-speed, quality-of-service (QoS)-enabled broadband (cable) architecture.

PacketCable interconnects three networks: Hybrid Fiber Coaxial (HFC) Access Network; Public Switched Telephone Network (PSTN); and TCP/IP Managed IP Networks. PacketCable Protocols are: DOCSIS, which is a standard for data over cable; Real-time Transport Protocol (RTP) and Real Time Control Protocol (RTCP), which are required for media transfer; PSTN Gateway Call Signaling Protocol Specification (TGCP), which is an MGCP (Media Gateway Control Protocol) extension for Media Gateways; and Network-Based Call Signaling Protocol Specification (NCS) which is an MGCP extension for analog residential Media Gateways—the NCS specification, which is derived from the IETF MGCP RFC 2705, details VoIP signaling.

Instead of using ROCs value as in SRTP (ROC being associated with the number of packets communicated), PacketCable uses a parameter called Nwrap, which is a counter that counts number of times the RTP timestamp wraps around. The transmitting and the receiving devices have to maintain a count (Nwrap) of RTP timestamp wraps around within the range 0 to $2^{16}-1$, which means that every time the value of an RTP packet's timestamp wraps around, the value of Nwrap is incremented by one. The value of Nwrap is initialized to zero at the time the communication connection is established. Nwrap has to be incremented also (in synchronization) at the receiver before the receiver can correctly decrypt RTP packets which are received past a wraparound point. The meaning of Nwrap will be explained by using the following example.

Example

An RTP voice packet may initially have a random timestamp equal to the hexadecimal value 0xFFFFF000. Assuming that each voice packet is 40 msec. long and the voice signal's sampling rate is eight samples per millisecond, then the length of each voice packet, in terms of samples, is 320 (40*8=320). It is also assumed, for simplicity, that the current value of Nwrap is zero. Referring also to Table-1 below, each time a (voice) packet is transmitted, the number of transmitted samples (TS) grows by 320 (samples). So long as the value of TS remains within the range 0 to $2^{32}-1$, the value of Nwrap remains unchanged (0 in this example) for packets numbers 1 through i. However, adding 320 samples of packet number i+1 to 0xFFFFFF00 (the TS value for packet number i), results in the TS value wrapping around the TS maximum limit, for which reason the value of Nwrap relating to packet i+1 is shown incremented (from 0) to 1.

TABLE 1

| Packet No. | TS | Nwrap value |
|---|---|---|
| 1 | 0xFFFFF000 | 0 |
| 2 | 0xFFFFF140 | 0 |
| 3 | 0xFFFFF280 | 0 |
| 4 | 0xFFFFF3C0 | 0 |
| 5 | 0xFFFFF500 | 0 |
| ⋮ | | |
| i | 0xFFFFFF00 | 0 |
| i + 1 | 0x40 | 1 |

Like ROC values, Nwrap values are not transmitted with the transmitted packets, as the transmitter and receiver increment their own Nwrap counters, and the receiver attempts to keep track of (to synchronize to) the transmitter's Nwrap value (by utilizing other data in the received packets).

Media Switchover

Regarding IPSEC, a solution for switching over between a network device to another network device may include switching security associations between the devices and using two different sequence numbers domains relative to a predetermined maximum sequence number. According to this solution the two involved network devices are associated with the same security association but one network device is associated with a pre-defined sequence number limit less than the maximum sequence number and the other network device has an initial sequence number greater than the maximum sequence number. Such a solution is more completely disclosed at U.S. Pat. No. 6,966,003.

However, the solution disclosed at U.S. Pat. No. 6,966,003 cannot work for SRTP because, as opposed to IPSEC (where the 32-bit sequence numbers (SEQs) are explicitly included in the header of each IPSEC packet, which makes its extraction in the receiving device relatively easy), in SRTP the RTP SEQ is only 16-bits long and, therefore, RTP SEQ numbers cannot be utilized for switching over(s) in the way IPSEC sequence numbers are utilized in U.S. Pat. No. 6,966,003. Instead, in order to save communication bandwidth, the SRTP protocol traditionally utilizes an index (referred to herein as modified SEQ index—i) for sequencing packets, which includes, or is consisted of, implicit index elements, as is shown in expression (1):

$$i=2^{16}*ROC+SEQ \qquad (1)$$

where i is a modified SEQ index used for sequencing each packet, SEQ is an explicit RTP sequence number uniquely assigned to each packet within a given ensemble of $2^{16}$ packets and ROC (rollover counter) is a counter whose value in the transmitter is incremented by one at the transmitter each time SEQ is wrapped around and in the receiver the ROC value is also incremented by one in accordance with the received packets, as is more fully disclosed and described in RFC 3711, the content of which is incorporated herein by reference in its entirety. The transmitter does not transmit its ROC value but, rather, the receiver attempts to synchronize to that ROC value by correspondingly incrementing its own ROC value.

The modified SEQ index i is used in replay protection (see RFC 3711, Section 3.3.2), encryption (see RFC 3711, Section 4.1), message authentication (see RFC 3711, Section 4.2), and for the communication keys derivation (see RFC 3711, Section 4.3). In addition, sequence numbers are updated per each new packet and since thousands of packets may be transmitted each second, updating and maintaining a large number of sequence numbers for switching over purposes is a very ineffective solution. For example, updating and maintaining the sequence number information on a per-packet basis will result in valuable network resources, such as processing time and bandwidth, being wasted. In addition, if the redundant network device serves (backups) more than one network device, it may be even more difficult for the redundant network device to deal with a huge number of sequence numbers respectively corresponding to multiple network devices.

Since it is expected that the SRTP and the PacketCable™ security (which is also based on RTP) will dominate the media security field, it will be beneficial to devise a way to enable switchover between secured media network devices such as RTP-enabled network devices.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantageous or improvements.

As part of the present disclosure, a method is provided for maintaining a primary network media device(s) ("NMD(s)") and a secondary network media device (NMD) at substantially similar encryption state, wherein the secondary NMD may be a redundant network media device that backs up the primary NMD(s). The NMD(s) may be a network media processing board(s), network media gateway(s), network media server(s) and the like. The method may include switching between a primary (the normally active, or the main) NMD and the redundant NMD if the primary NMD fails to provide a service to a remote network device which may be a remote NMD.

According to some embodiments parameters (hereinafter called "switchover parameters") associated with the switching over(s) may be updated according to a predetermined criteria, for example at least once per $2^X$ packets ($1 \leq X < 15$, preferably X equals 13) that are transmitted from the primary network device to a remote (user's) network device or after $2^X$ packets that are received at the primary network device from the remote network device, whichever is reached first.

According to some embodiments when the communication session between the primary NMD and the remote NMD is interrupted due to the primary NMD failing to maintain communication (failing to provide a service to the remote NMD), the redundant NMD may utilize switchover parameters stored in a memory storage array to continue the communication session with (to further provide the service to) the remote NMD. The redundant NMD may access updated switchover parameters which are either stored in its local memory storage array, or forwarded to the redundant NMD from a remote memory storage array.

According to some embodiments the redundant NMD may back-up one primary NMD to which the redundant NMD may be coupled directly. According to some embodiments the redundant NMD may back-up more than one active NMD, all of which may be coupled directly to a central network device ("CND"). According to these embodiments the CND may store in its memory storage array switchover parameters for each one of the primary NMDs coupled to the CND, and the CND may forward to the redundant NMD (to which it is also coupled) only switchover parameters relevant to, or associated with, a failing primary NMD.

According to some embodiments switching over from an active primary NMD to a redundant NMD may involve estimation, by the redundant NMD, of current transmission switchover parameters based on the last switchover parameters update. Switchover parameters may be provided to the redundant NMD either directly (from the active primary NMD(s)) or indirectly (from a CND)

According to some embodiments switchover parameters may be associated with the IPSEC protocol. According to some other embodiments switchover parameters may be associated with the SRTP or PacketCable Security protocols.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which.

DETAILED DESCRIPTION

Figure 1:
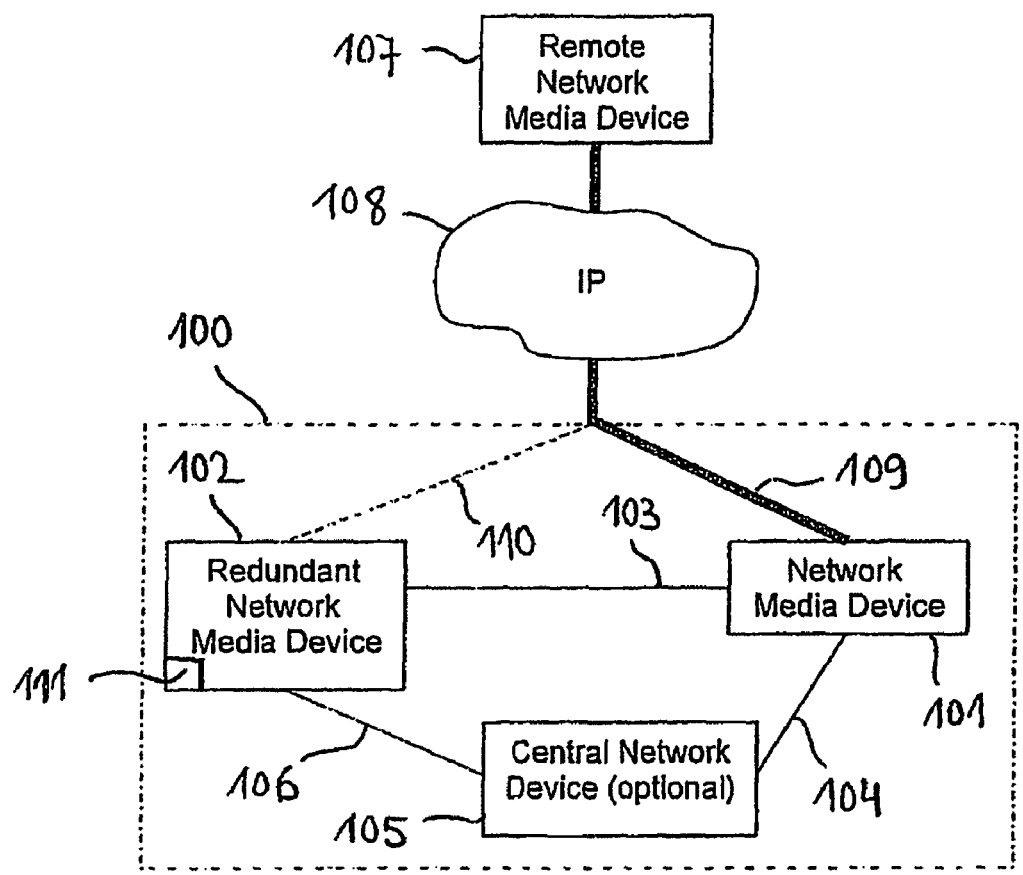
FIG. 1 schematically illustrates a general layout and functionality of a typical redundancy system.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The present disclosure may take the form of an entirely hardware embodiment, an entirely software embodiment or an embodiment containing both hardware and software elements. In a preferred embodiment, the disclosure is implemented in software, which includes but is not limited to firmware, resident software, microcode, and so on.

Embodiments of the present disclosure may include apparatuses for performing the operations described herein. This apparatus may be specially constructed for the desired purposes, or it may comprise a general purpose computer selectively activated or reconfigured by a computer program stored in the computer Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution. Input/output or I/O devices (including but not limited to keyboards, displays, pointing devices, and so on) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present disclosure are not described with reference to any particular programming language. It will be appreciated that a variety of programming languages may be used to implement the teachings of the disclosures as described herein.

The term network media device generally refers to a device mainly used in computer networks (such as the Internet) to facilitate communication of multimedia, real time sessions and files such as audio files, video files, image files and the like.

Referring now to FIG. 1, a general layout and functionality of a typical redundancy system (generally shown as 100) is schematically illustrated. System 100 may include one or more primary network device(s) such as network media device (NMD) 101 and a secondary network device such as Redundant NMD 102, which may serve as a redundant network device for backing up the one or more primary network device(s). If system 100 includes only one NMD such as NMD 101 (as shown in FIG. 1), then NMD 101, which is the active device intended to provide service(s) to users, may directly update (shown at 103) memory storage array 111 in Redundant NMD 102, such as by copying reception and transmission switchover parameters to memory storage array 111. According to some embodiments memory storage array 111 (for example a database) may be used for storing (among other things) switchover parameters, and the active NMD (NMD 101) may update the value of the stored switchover parameters (a process generally referred to hereinafter as a "switchover update") according to a predetermined time interval.

According to some embodiments switchover parameters stored, for example in memory storage array 111, may be associated with non-secured data communication. Exemplary non-secure switchover parameters are the IP address of the user, UDP ports, speech-related parameters (such as information of the coder used, silence compression use and frame size) and packetization parameters (such as the number of frames in each packet, redundancy mode, RTP payload type, synchronization source identifier, and so on).

According to some embodiments switchover parameters stored in the memory storage array may be associated with secured data communication. Exemplary secure switchover parameters are security keys, packet time stamp (TimeStamp), packet sequence number (SEQ), RTCP index, rollover counter (ROC) and Nwrap (the number of RTP timestamp wraps around).

According to some embodiments memory storage array 111 may reside within the redundant NMD 102 (as is shown in FIG. 1) and the active NMD 101 may update memory storage array 111 by directly communicating with the redundant NMD 102. According to some other embodiments memory storage array 111 may reside within a central network device such as central network device (CND) 105 coupled to the active NMD 101 (shown at 104) and to the redundant NMD 102 (shown at 106), and the active NMD 101 may update the memory storage array in the CND 105 according to the predetermined criteria ($2^X$ packets received at or transmitted by NMD 101).

Alternatively, NMD 101 may update (shown at 104) a memory storage array (not shown) residing within a central network device (CND), such as Central Network Device 105, with switchover parameters, and Central Network Device 105 may update (shown at 106) memory storage array 111 in Redundant NMD 102, though the latter architecture (using a central network device such as Central Network Device 105) is adopted when a relatively large number of network media devices, such as NMD 101, is used, because it is much simpler for Redundant NMD 102 to deal with one central network device than to deal with several NMDs.

System 100 may provide media content to many Remote NMDs such as Remote NMD 107 over a packet-switched network (shown at 108). Communication path 109 has to be high bandwidth channel because of the relatively high data rate typically involved in the communication of media content. When NMD 101 fails to provide the media content required, for example, by Remote NMD 107, then, in order to guarantee the vowed high availability, communication with Remote NMD 107 is transparently transferred from NMD 101 (shown at 109) to Redundant NMD 102 (shown at 110), and service is rendered to Remote NMD 107 substantially without interruption.

Secure Media Switchover

According to the present disclosure, Redundant NMD 102 may include a database or any suitable memory storage array (shown at 111 in FIG. 1) for storing therein switchover parameters associated with a communication session in progress between NMD 101 and Redundant NMD 107. Normally, a communication session between two devices starts using a stage called negotiation, during which stage each device the devices exchange their capabilities and communication details (keys, for example). However, by using a memory storage array (such as memory storage array 111) in the way described herein, such a negotiation between Redundant NMD 102 and Remote NMD 107 is eschewed. That is, Redundant NMD 102 does not have to renegotiate with the user (for example with Remote NMD 107).

Regarding non-secure communication, switchover parameters stored in memory storage array 111 may be changed (updated) only from one communication session to another. Therefore, the communication between NMD 101 and Redundant NMD 102 (shown at 103) requires a bandwidth that is significantly narrower in comparison to the bandwidth required for transferring media content over communication path 109. Exemplary switchover parameters that may be stored in the memory storage array may be the source and destination IP address, source and destination UDP ports, parameters relating to the coder, parameters relating to the packetization, and so on, which are associated with voice communications.

If Redundant NMD 102 obtains updated switchover parameters from a third part such as Central Network Device 105, rather than by being updated directly (shown at 103), then memory storage array 111 may alternatively reside within CND 105, which may independently communicate with NMD 101 and Redundant NMD 102. The architecture in which one device (Redundant NMD 102, for example) serves as a redundant device to back-up N NMDs such as NMD 101 is commonly known in the field as "N+1" (or "1+N") architecture, schematically shown in FIG. 2.

SRTP

When a communication session starts between a remote network media device (such as Remote NMD 107) and a network media device (such as NMD 101), each side must set the value of ROC to zero During the (bidirectional) communication session, each side (Remote NMD 107 and NMD 101, for example) transmits packets to, and receives packets from, the other side. Every time the SEQ (an RTP packets sequence number) associated with a sender (whether with Remote NMD 107 or NMD 101) is wrapped around, the sender has to increment the value of its ROC by 1.

As is shown in expression (1), the ROC's value is used for constructing the modified SEQ index (i) but the ROC's value itself is not transmitted explicitly (as is) in the packets. Further, being 16-bit long, RTP SEQ numbers cannot be used for switchover, as opposed to using 32-bit long SEQ in IPSEC as disclosed at U.S. Pat. No. 6,966,003, because the number of packets transmitted by an active NMD within a communication session often exceeds 64,000 ($=2^{16}$), which is the maximal sequence number available for RTP packets. In addition, SEQ starts from some random number and not from zero, as opposed to using SEQ in IPSEC. Therefore, no SEQ value within the range $1-2^{16}$ can be used as a new reference SEQ number for switching over between an active NMD, such as NMD 101, and a redundant NMD such as Redundant NMD 102.

Theoretically, memory storage array 111 may contain an updated ROC value and an updated SEQ value for each received and transmitted packet. However, this solution requires a large communication bandwidth and considerable processing power, and it is far from being practical.

The system and method disclosed in the present disclosure take advantage of the capability of the SRTP protocol to successfully deal (under certain restriction) with network impairments such as packet losses and packets reordering. According to RFC 3711, a receiver is expected to perform well as long as the reorder and loss of the packets are not too great, and bit-errors do not occur in unfortunate ways. In particular, as high as $2^{15}$ packets would need to be lost, or a packet would need to be $2^{15}$ packets out of sequence before synchronization (between the transmitting device and the receiving device) is lost because, according to RFC 3711, such drastic loss or reorder is likely to disrupt the RTP application itself.

By using the above-explained capability of the SRTP protocol, the update rate at which switchover parameters may be copied from a NMD (for example from NMD 101) to a redundant NMD (for example to Remote NMD 102) may be substantially as low as once per $2^{15}$ packets, which is a relatively very low update rate. The lower the switchover update rate the better, because a lower switchover update rate means that a narrower communication bandwidth is involved in, and less computational resources are required for, the updating of the memory storage array. A safety margin may be provided by updating the redundant NMD at a rate lower than $2^{15}$, for example every $2^{13}$ transmitted or received packets, whichever is reached first. The safety margin is needed to prevent or avoid problems that may be caused by, or result from, network impairments.

RTP involves using a special type of packet, called RTCP packet, for controlling the RTP session. RTCP packets do not carry any portion of the data or information intended for the end-user(s) but they allow the device receiving them to estimate the quality of the communication path or link. RTCP packets need to be protected (secured) as well as other types of packets. For RTCP protection in SRTP (also called SRTCP), an SRTCP index is appended to each transmitted packet SRTCP indexes are used for replay protection in SRTP in a similar way SEQ indexes are used in IPSEC.

In voice channel the time between updates (TBUs) may be given by expression (2):

$$TBU=2^{13}*Frame\_Size*Num\_Frames\_Per\_Packet \quad (2)$$

where $2^{13}$ is an exemplary update rate, Frame_Size is the size of a frame in a RTP packet in milliseconds (msec.), and Num_Frames_Per_Packet is the number of frames in a RTP packet. Assuming, for example, that Frame_Size=20 msec. and Num_Frames_Per_Packet=2, then TBU=327 68 seconds, which is considered a relatively low update rate.

According to the present disclosure, the following four types of switchover parameters may be copied from a NMD to a redundant NMD for obtaining a substantially transparent switchover (for maintaining NMD 101 and Redundant NMD 102 at substantially similar encryption state): (1) packet timestamp (Timestamp) (2) packet sequence number (SEQ), (3) roll over counter (ROC) and (4) RTCP index. Since a NMD transmits and receives packets, eight parameters have to be copied to the redundant NMD; that is, four switchover parameters, called herein "transmission switchover parameters", are used in the transmission of packets from the NMD, and four switchover parameters, called herein "reception switchover parameters", are used in the reception of packets at the NMD. Accordingly, updating a redundant NMD such as Redundant NMD 102 involves copying to the redundant NMD the following eight switchover parameters (four reception switchover parameters and four transmission switchover parameters):

Transmission Switchover Parameters:

(1) RTP_Tx_TimeStamp (RTP stands for RTP protocol), which is the time stamp assigned to a packet that is transmitted from a NMD (from NMD 101, for example) to a remote NMD (to Remote NMD 107, for example);

(2) RTP_Tx_SEQ (RTP stands for RTP protocol), which is the sequence number of (assigned to) a packet that is transmitted from a NMD (from NMD 101, for example) to a remote NMD (to Remote NMD 107, for example);

(3) RTP_Tx_ROC (RTP stands for RTP protocol), which is the ROC value associated with a packet that is transmitted from a NMD (from NMD 101, for example) to a remote NMD (to Remote NMD 107, for example; and (4) RTCP_Tx_Index (RTCP stands for RTCP protocol), which is the RTCP index associated with a packet that is transmitted from a NMD (from NMD 101, for example) to a remote NMD (to Remote NMD 107, for example.

Reception Switchover Parameters:

(5) RTP_Rx_TimeStamp (RTP stands for RTP protocol), which is the timestamp assigned to a packet that is received from a remote NMD (from Remote NMD 107, for example) by a NMD (by NMD 101, for example);

(6) RTP_Rx_SEQ (RTP stands for RTP protocol), which is the sequence number of (assigned to) a packet that is received from a remote NMD (from Remote NMD 107, for example) by a NMD (by NMD 101, for example);

(7) RTP_Rx_ROC (RTP stands for RTP protocol), which is the ROC value associated with a packet that is received from a remote NMD (from Remote NMD 107, for example) by a NMD (by NMD 101, for example); and (8) RTCP_Rx_Index (RTCP stands for RTCP protocol), which is the RTCP index associated with a packet that is received from a remote NMD (from Remote NMD 107, for example) by a NMD (by NMD 101, for example).

Whenever the term "current" is used herein in connection with a particular switchover parameter, it is meant the initial value of the switchover parameter that is to be used by the redundant NMD (Redundant NMD 102, for example) after switchover is completed. Whenever the term "last" is used in connection with a particular switchover parameter, it is meant the value of the switchover parameter that was last copied to the redundant NMD during, or as a result of, the last switchover update.

Since, as is explained earlier, receiving media devices use SRTP to remedy up to $2^{15}$ lost packets and packets that are up to $2^{15}$ out of sequence, the transmission switchover parameters and the reception switchover parameters are calculated in different ways, as is described hereinafter. When NMD 101 fails to render a service to a remote NMD, Redundant NMD 102 may utilize the switchover parameters sent to it during the last switchover update to calculate/estimate the transmission and reception switchover parameters. Since, as explained earlier, switchover updates are done, for example, once every $2^{13}$ packets, and switching over will most likely be required between two consecutive switchover updates, Redundant NMD 102 cannot use the last switchover parameters sent to it for transmitting packets to Remote NMD 107, because switchover parameters change per transmitted packet. Therefore, an attempt to transmit a packet from Redundant NMD 102 (for example) to Remote NMD 107 (for example) using the last, irrelevant, switchover parameters will result in the Redundant NMD 107 ignoring or discarding that packet. Therefore, according to some embodiments of the present disclosure, Redundant NMD 102 may utilize the last known value of the switchover parameters to estimate the current (or actual) value of the transmission switchover parameters as follows:

1) Current RTP_Tx_TimeStamp=Last RTP_Tx_TimeStamp+$\Delta T$ where Last RTP_Tx_TimeStamp is the value of RTP_Tx_TimeStamp sent to the redundant NMD during the last switchover update and $\Delta T$ is the time difference between the last update time and the switchover time. Current RTP_Tx_TimeStamp is, therefore, the initial timestamp assigned by Redundant NMD 102 (in this example) to the first packet Redundant NMD 102 transmits.

2) Current RTP_Tx_SEQ=Last RTP_Tx_SEQ+$2^{13}$+$\Delta_{SEQ}$ where Last RTP_Tx_SEQ is the value of RTP_Tx_SEQ sent to Redundant NMD 102 during the last switchover update, $2^{13}$ is an exemplary number for switchover packet update rate. Adding the value $2^{13}$ (for example) and using $\Delta_{SEQ}$ provides a safety margin, or offset, that ensures that substantially no conflict will occur in Remote NMD 107 between a packet sent by Redundant NMD 102 to the last packet(s) sent by NMD 101 but received at Redundant NMD 107. An exemplary value of $\Delta_{SEQ}$ may be 500 (packets). The remote network media device (Remote NMD 107 for example) can successfully deal with such an offset value ($2^{13}$+$\Delta_{SEQ}$) because the SRTP protocol is designed to deal, or to cope, with up to $2^{15}$ lost packets.

3) Current RTP_Tx_ROC=Last RTP_Tx_ROC where Last RTP_TX_ROC is the value of RTP_Tx_ROC sent to Redundant NMD 102 during the last switchover update. It is noted that sometimes, after adding $2^{13}$ and $\Delta_{SEQ}$ to Last RTP_Tx_ROC, condition (3) may be met, which means that Current RTP_Tx_ROC overflows (wraps around or rolls over) and, therefore, in such cases, the value of Current RTP_Tx_ROC is incremented by one (Current ROC=Current ROC+1) to synchronize with the remote NMD (for example with Remote NMD 107).

$$\text{Current RTP\_Tx\_SEQ<Last RTP\_Tx\_SEQ} \quad (3)$$

4) Current RTCP_Tx_Index Last RTCP_Tx_Index+$\Delta T$/(Mean_RTCP_Interval)+$\Delta_{index}$ where Mean_RTCP_Interval is the average time elapsing between transmission of two consecutive RTCP packets from NMD 101 to Remote NMD 107. Therefore, $\Delta T$/(Mean_RTCP_Interval) provides an average number of RTCP packets that were transmitted from the last switchover update until the actual switchover instant. For example, if the last switchover update occurred at time t0 and switchover actually occurs 300 seconds later (to+300 seconds), then $\Delta T$=300 seconds, Next, if Mean_RTCP_Interval equals 5 seconds, then this means that NMD 101 had managed to transmit (to Redundant NMD 107) 6 (300/5) RTCP packets before switchover occurred. Since the value of RTCP_Tx_Index monotonically increases with each transmitted RTCP packet, Last RTCP_Tx_Index is incremented by the average number of RTCP packets transmitted during the period $\Delta T$.

As is explained earlier, a receiving media device can successfully deal with up to $2^{15}$ lost packets and with packets that are up to $2^{15}$ out of sequence. Therefore, as opposed to having to estimate the transmission switchover parameters, Redundant NMD 107 does not have to estimate current values of reception switchover parameters but, rather, these values may be obtained directly:

5) Current RTP_Rx_SEQ=Last RTP_Rx_SEQ where Last RTP_Rx_SEQ is the value of RTP_Rx_SEQ sent to Redundant NMD 102 during the last switchover update;

6) Current RTP_Rx_ROC=Last RTP_Rx_ROC where Last RTP_Rx_ROC is the value of RTP_Rx_ROC sent to Redundant NMD 102 during the last switchover update; and 7) Current RTCP_Rx_Index=Last RTCP_Rx_Index where Last RTCP_Rx_Index is the value of RTCP_Rx_Index sent to Redundant NMD 102 during the last switchover update.

PacketCable

Since PacketCable utilizes RTP packets, switching over between an active NMD (such as NMD 101) and a redundant NMD (such as Redundant NMD 102) may be implemented in a similar manner as in SRTP (SRTP switchover), with an exception; PacketCable switchover utilizes packets' timestamps as opposed to using packets' sequence numbers (SEQs) in SRTP switchover, and the ROC used in SRTP is substituted in PacketCable with an equivalent parameter called Nwrap. Like SRTP, PacketCable also provides protection against replay attacks.

Timestamp Tolerance Check

Before a packet received at, and processed by, a NMD such as NMD 101, the NMD must perform a sanity test on the timestamp value in each RTP header. Sanity test is a brief run-through of the main functionality of a computer program or other product. Sanity test gives a measure of confidence that the system works as expected prior to a more exhaustive round of testing.

As part of the PacketCable methodology, sanity test typically consists of the following steps:

1. Beginning with the RTP timestamp assigned to the first packet that is received from a sender in a new communication session, the receiver calculates an expected value for the timestamp of the sender's next RTP packet, based on extrapolation of timestamps relating to previously received packets within the same communication session; and 2. The next received packet is rejected without being processed if the timestamp value associated with that packet resides outside, or exceeds, a reasonable tolerance of the calculated expected value. Timestamps associated with rejected packets are not extrapolated to estimate or predict future packets' timestamps. By "reasonable tolerance" is meant a timestamp tolerance range that is sufficiently small to ensure that an invalid timestamp value cannot derail the receiver's state so much that the receiver cannot quickly recover to decrypt valid ingress packets. In addition, the timestamp tolerance range has to be chosen such that known differences in the expected and received timestamp values are factored in, because such differences may occur at call startup, at codec switchover and due to sender/receiver clock drift which, under certain conditions, may cause them to be desynchronized.

If a relatively long series of consecutive RTP packets have timestamps whose value exceeds the acceptable range, the receiving media device (for example NMD 101) terminates, or aborts, the communication session. Otherwise, upon reception of each (legitimate) packet the receiving media device (for example NMD 101) adjusts, or offsets, its time so as to synchronize to the packets' sender (for example to Remote NMD 107); that is, within the acceptable tolerance range of estimated timestamps.

PacketCable switchover involves sending switchover updates to the redundant device (to Redundant NMD 102, for example) in a way similar to the way described in connection with SRTP, though sequence numbers and ROC values (which are used in SRTP) are substituted in PacketCable with timestamps and Nwraps, respectively, as is described hereinafter. Like in SRTP switchover, PacketCable switchover also involves copying (in this case three types of) transmission and reception switchover parameters to the redundant NMD.

Transmission Switchover Parameters:
1) RTP_Tx_TimeStamp, which is the timestamp of the packets transmitted from the NMD;
2) RTP_Tx_Nwrap, which is the Nwrap associated with the packets transmitted from the NMD; and
3) RTCP_Tx_SequenceNumber, which is the sequence number of the packets transmitted from the NMD.

Reception Switchover Parameters:
4) RTP_Rx_TimeStamp, which is the timestamp of the packets received at a NMD;
5) RTP_Rx_Nwrap, which is the Nwrap associated with the packets received at the NMD; and
6) RTCP_Rx_SequenceNumber, which is the sequence number of the packets received at the NMD.

Like in SRTP switchover, and for similar reasons, the value of the following transmission switchover parameters has to be estimated by the redundant NMD in order to obtain transparent switchover parameters: Current RTP_Tx_TimeStamp, Current RTP_Tx_Nwrap and Current RTCP_Tx_SequenceNumber. Accordingly, Redundant NMD 102 (for example) may utilize the last known value of the switchover parameters to estimate the current (or actual) value of the transmission switchover parameters as follows:

1) Current RTP_Tx_TimeStamp=Last RTP_Tx_TimeStamp+$\Delta T$ where Last RTP_Tx_TimeStamp is the value of RTP_Tx_TimeStamp sent to the redundant NMD during the last switchover update and $\Delta T$ is the time difference between the last update time and the switchover time. Current_RTP_TimeStamp is, therefore, the initial timestamp assigned to the first packet transmitted by Redundant NMD 102 (in this example).

2) Current RTP_Tx_Nwrap=Last RTP_Tx_Nwrap where Last RTP_Tx_Nwrap is the value of RTP_Tx_Nwrap sent to the redundant NMD during the last switchover update. It is noted that sometimes condition (4) below may be met, which means that Current RTP_Tx_TimeStamp wraps around and, therefore, in such cases, the value of Nwrap is incremented by one (Nwrap=Nwrap+1) to keep synchronization with the remote NMD (for example with Remote NMD 107).

$$\text{Current RTP\_Tx\_TimeStamp} < \text{Last RTP\_Tx\_TimeStamp} \qquad (4)$$

3) Current RTCP_Tx_SequenceNumber=Last RTCP_Tx_SequenceNumber+$\Delta T$/(Mean_RTCP_Interval)+$\Delta_{SEQ}$ where Mean_RTCP_Interval is the average time elapsing between transmission of two consecutive RTCP packets from NMD 101 (for example) to Remote NMD 107 (for example). Therefore, the expression $\Delta T$/(Mean_RTCP_Interval) provides an average number of RTCP packets that were transmitted from the last switchover update until the actual switchover instant. For example, if the last switchover update occurred at time t0 and another switchover occurs 300 seconds later, at time t1 (t1=to+300 seconds), then $\Delta T$=300 seconds, Next, if Mean_RTCP_Interval equals 5 seconds, then this means that NMD 101 had managed to transmit (to Redundant NMD 107) 6 (300/5) RTCP packets before switchover occurred. Since the value of RTCP_Tx_SequenceNumber monotonically increases with each transmitted RTCP packet, Last RTCP_Tx_SequenceNumber is incremented by the average number of RTCP packets transmitted during the period $\Delta T$.

For reasons specified hereinbefore in connection with SRTP switchovers, a redundant NMD such as Redundant NMD 107 does not have to estimate current values of reception switchover parameters since these values may be obtained directly, in the following way:

4) Current RTP_Rx_TimeStamp=Last RTP_Rx_TimeStamp;
5) Current RTP_Rx_Nwrap=Last RTP_Rx_Nwrap; and
6) Current RTCP_Rx_SequenceNumber=Last RTCP_Rx_SequenceNumber.

In other words, the Current RTP_Rx_TimeStamp, Current RTP_Rx_Nwrap and Current RTCP_Rx_SequenceNumber are assigned the Last RTP_Rx_TimeStamp, Last RTP_Rx_Nwrap and Last RTCP_Rx_SequenceNumber (respectively) that the Redundant NMD obtained (these parameters copied to Redundant NMD) during the last switchover update.

Figure 2:
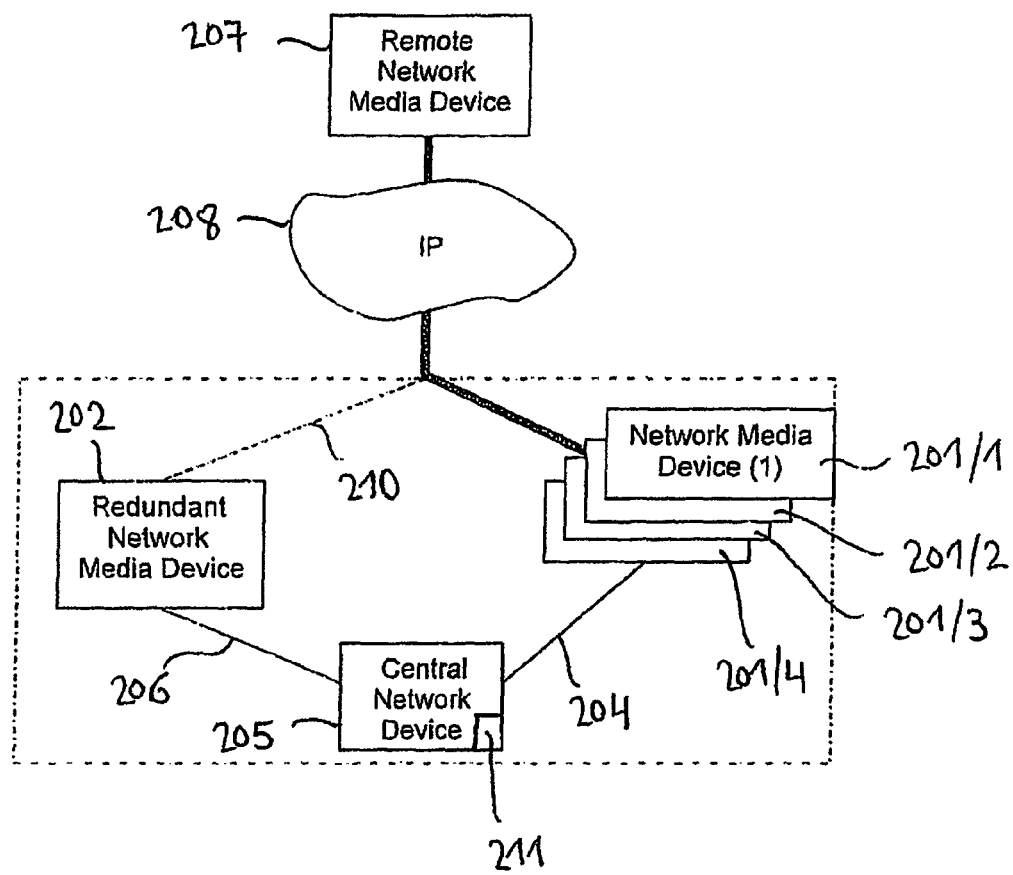
FIG. 2 schematically illustrates a general layout and functionality of a typical "1+N" redundancy system.

Referring now to FIG. 2, an exemplary general layout and functionality of "N+1" redundancy-rendering system (generally shown at 200) is schematically illustrated. Since according to this example system 200 includes multiple primary Network media devices, designated 201/1, 201/2, 201/3 and 201/4, each functioning substantially like NMD 101 of FIG. 1, a direct switchover update, like the direct switchover update done over communication path 103 in FIG. 1, is not recommended because a network media device, for example NMD 201/1, may fail. As a result of the failure of NMD 201/1, (for example), switching over to a secondary NMD such as Redundant NMD 202 may be required. However, another network media device, for example NMD 201/4, may attempt to update Redundant NMD 202 during the switchover, which will interfere with the switchover process. Therefore, instead of using a direct communication path between a NMD and a redundant NMD (such as the direct communication path shown at 103 in FIG. 1), a central device such as Central Network Device 205 is used. Each one of the NMDs 201/1 through 201/4 may update (shown at 204) Central Network Device 205 with the respective switchover parameters. The updates rate may be similar to the update rate used for one network media device (that is, after every transmission or reception of $2^X$ packets). Network Device 205 may store in memory storage array 211 the last switchover parameters forwarded to it (shown at 204) from each one of the NMDs coupled to it. If one of the NMDs 201/1 through 201/4 fails to provide service to Remote NMD 207 (via data network 208), then, by monitoring NMDs 201/1 through 201/4, Central Network Device 205 may identify the failing NMD and forward (shown at 206) to Redundant NMD 202 only switchover parameters relevant to, or associated with, the failing NMD. Redundant NMD 202 may substitute the failing NMD by using the switchover parameters forwarded to it from Central Network Device 205 to communicate with Remote NMD 207, over communication path 210 and data network 208.

According to some embodiments Central Network Device 205 may store switchover parameters associated with NMD 201/1 through 201/4 in a central memory storage array such as memory storage array 211. According to these embodiments when Central Network Device 205 identifies a failing NMD, Central Network Device 205 may locate in memory storage array 211, gather therefrom and send to the redundant NMD only switchover parameters associated with the failing NMD. Alternatively, Central Network Device 205 may store in a different memory storage array switchover parameters associated with different NMD.

Figure 3:
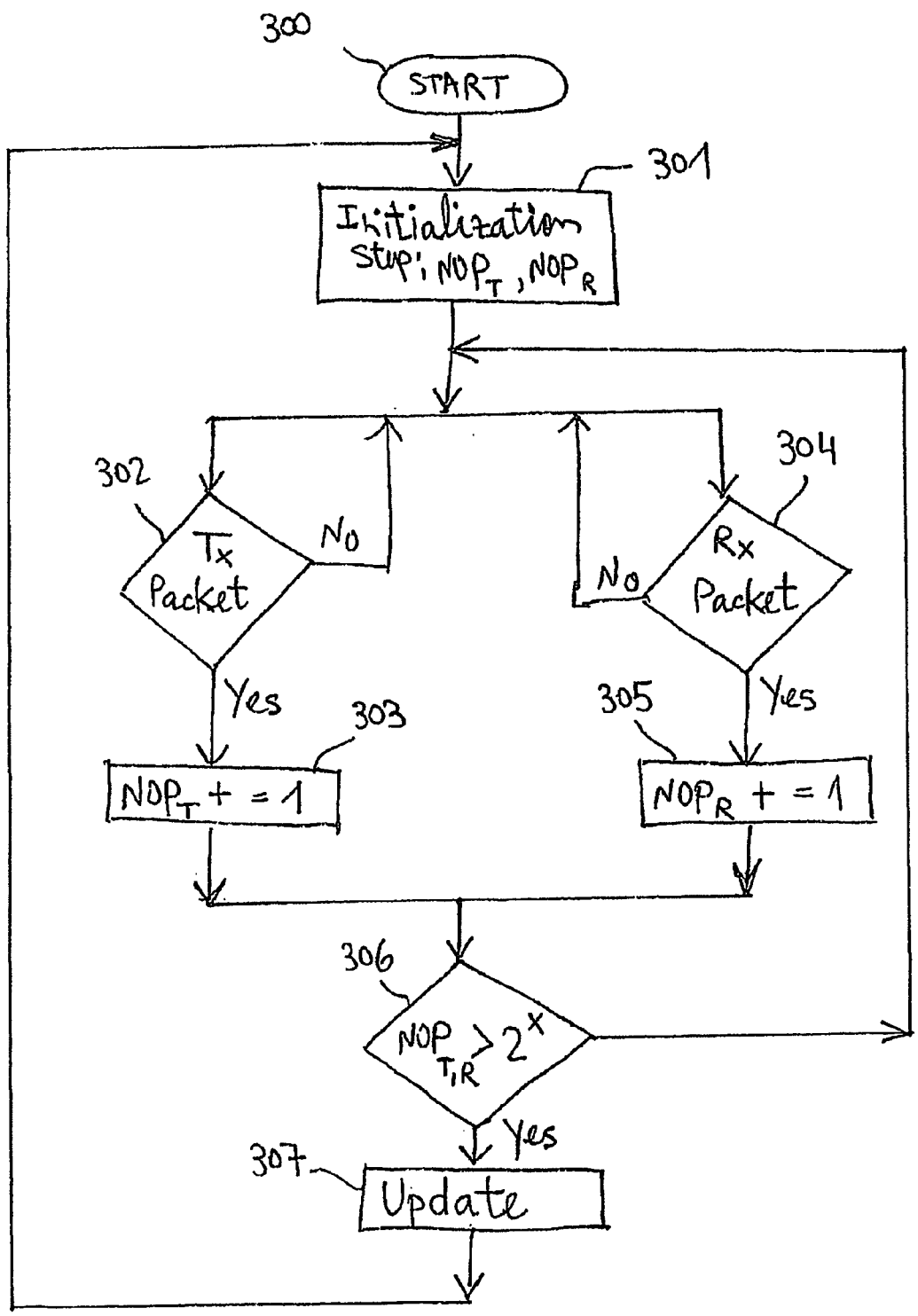
FIG. 3 is a flowchart showing an exemplary method for determining when a SRTP switchover update should take place It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Referring now to FIG. 3, a flow chart showing an exemplary method for determining when a RTP switchover update should take place. FIG. 3 is described in association with FIG. 1 It is assumed that a previous switchover update already occurred a while ago, and it is required to determine the time of the following, or next, switchover update. Two variables may be used: (1) $NOP_T$ (Number Of Packets transmitted, for example from NMD 101 to Remote NMD 107), and (2) $NOP_R$ (Number Of Packets transmitted, for example, from Remote NMD 107, and received, for example at NMD 101). The number of transmitted and received packets may be obtained by using the packets' sequence numbers (SEQs), as each packet is assigned a unique sequence number.

At the time the previous switchover update occurred, or immediately thereafter, $NOP_T$ and $NOP_R$ are initialized, such as by setting their value to zero (at step 301). After, or while, the previous switchover update is completed, the application may run normally; that is, NMD 101 (for example) may continually transmit packets to, and receive packets from, Remote NMD 107, for example. Every time NMD 101 (for example) transmits a packet (shown as Yes at 302) to Remote NMD 107 (for example), variable $NOP_T$ is incremented by one (shown at 303) to count the packets transmitted from NMD 101 (for example) since the last (previous) switchover update. The value of $NOP_T$, will remain unchanged after the last increment so long as NMD 101 does not transmit additional packets (shown as No at 302). Likewise, every time NMD 101 receives a packet (shown as Yes at 304) from Remote NMD 107 (for example), variable $NOP_R$ is incremented by one (shown at 305) to count the packets received at NMD 101 (for example) since the last (previous) switchover update.

According to some embodiments of the present disclosure if the value of $NOP_T$, or $NOP_R$ reaches $2^X$ (shown as Yes at 306, where X=13 (fox example), which is the predetermined maximum number of packets allowed to be communicated between each two successive switchover updates, then another switchover update takes place (shown at 307) and variables $NOP_T$ and $NOP_R$ are initialized (shown at 301). If neither of the variables $NOP_T$ and $NOP_R$ meets the criterion of reaching the value $2^X$ (shown as No at 306), then the application may continue to run normally; that is, NMD 101 (for example) may continue transmitting packets to, and receiving packets from, Remote NMD 107 (for example), which will cause $NOP_T$ and $NOP_R$ to increment in accordance with the number of transmitted and received packets. The flow chart of FIG. 3 can be similarly applied to any "1+N" system architecture such as the exemplary "1+N" system shown in FIG. 2 (where N=4 in this example). Referring again to FIG. 2, memory storage array 211 is independently updated (shown at 307 in FIG. 3) by each one of the NMDs 201/i (i=1 to 4, in this example).

The flowchart of FIG. 3 may be used in SRTP and in PacketCable switchover even though SRTP switchover and PacketCable switchover involve copying to the redundant NMD different types of switchover parameters In cases where non-secure data communication is involved, memory storage array 111 of FIG. 1 and memory storage array 211 of FIG. 2 may be updated once per communication session (rather than once per predetermined number ($2^X$) of transmitted/received packets).

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed:

1. A method of communication, comprising:

maintaining primary and secondary network media devices at a substantially similar encryption state, wherein the secondary network media device is a redundant network media device, wherein the maintaining comprises copying reception and transmission switchover parameters from the primary network media device to the redundant network media device, wherein the maintaining comprises utilizing a packet sequence number that is calculated based on an initial randomly-selected sequence number, wherein the maintaining comprises: at pre-defined time intervals, updating by the primary network media device values of the switchover parameters stored in a storage array residing within the secondary network media device;

wherein the method comprises: switching from the primary network media device to the secondary network media device by (a) estimating by the secondary network media device current values of transmission switchover parameters, and (b) calculating by the secondary network media device current values of reception switchover parameters, wherein maintaining comprises: based on last-known values of the switchover parameters, estimating current values of said transmission switchover parameters;

wherein the estimating comprises estimating of: a transmitted Real-Time Transport Protocol (RTP) time stamp, a transmitted RTP sequence number, a transmitted Rollover Counter (ROC), and a transmitted Real-Time Control Protocol (RTCP) index;

wherein the estimating comprises an estimation for re-synchronization by a security protocol based on the estimated current values of said switchover parameters using a mechanism corresponding to recovery from network packet loss.

2. The method according to claim 1, comprising:
determining by the primary network media device whether or not $2^X$ packets have been communicated;
if it is determined that $2^X$ packets have been communicated, then updating by the primary network media device values of the switchover parameters stored in the storage array residing within the secondary network media device.

3. The method according to claim 2, wherein X=13.

4. The method according to claim 1, wherein the redundant network media device receives packets by utilizing copied reception switchover parameters.

5. The method according to claim 1, wherein the redundant network media device transmits packets by estimating current transmission switchover parameters.

6. The method according to claim 5, wherein the current transmission switchover parameters are estimated based on copied transmission switchover parameters.

7. The method according to claim 1, wherein the switchover parameters are associated with Secure Real-time Transport Protocol.

8. The method according to claim 1, wherein the reception and transmission switchover parameters are associated with PacketCable protocol.

9. The method according to claim 1, wherein the switchover parameters comprise one or more of: packet time stamp, packet sequence number, rollover counter and RTCP index.

10. The method according to claim 1, wherein the switchover parameters comprise one or more of: packet time stamp, Nwrap and RTCP sequence number.

11. The method according to claim 1, wherein the redundant network media device backs-up a plurality of primary network media devices.

12. The method according to claim 11, wherein the switchover parameters are copied from a network media device to a central network device, and wherein one or more switchover parameters associated with a failing primary network media device are copied from said central network device to the redundant network media device.

13. A communication system, comprising:
a primary network media device; and
a secondary network media device wherein the secondary network media device is a redundant network media device;
wherein said primary and secondary network media devices are maintained at a substantially similar encryption state,
wherein reception and transmission switchover parameters are copied from the primary network media device to the redundant network media device,
wherein the communication system utilizes a packet sequence number that is calculated based on an initial randomly-selected sequence number,
wherein the communication system is to maintain the primary and secondary network media devices at a substantially similar encryption state by: at pre-defined time intervals, updating by the primary network media device values of the switchover parameters stored in a storage array residing within the secondary network media device;
wherein the secondary network media device is to perform switching from the primary network media device to the secondary network media device by (a) estimating current values of transmission switchover parameters, and (b) calculating current values of reception switchover parameters,
wherein, based on last-known values of the switchover parameters, current values of said transmission switchover parameters are estimated;
wherein the estimation comprises estimation of: a transmitted Real-Time Transport Protocol (RTP) time stamp, a transmitted RTP sequence number, a transmitted Rollover Counter (ROC), and a transmitted Real-Time Control Protocol (RTCP) index;
wherein the estimation comprises an estimation for re-synchronization by a security protocol based on the estimated current values of said switchover parameters using a mechanism corresponding to recovery from network packet loss.

14. The communication system according to claim 13, wherein the primary network media device is to determine whether or not $2^X$ packets have been communicated; and
if it is determined that $2^X$ packets have been communicated, then the primary network media device is to update values of the switchover parameters stored in the storage array residing within the secondary network media device.

15. The communication system according to claim 14, wherein X=13.

16. The communication system according to claim 13, wherein the redundant network media device receives packets by utilizing copied reception switchover parameters and transmits packets by estimating current transmission switchover parameters.

17. The communication system according to claim 16, wherein the redundant network media device estimates the current transmission switchover parameters based on copied transmission switchover parameters.

18. The communication system according to claim 13, wherein the reception and transmission switchover parameters are associated with Secure Real-time Transport Protocol.

19. The communication system according to claim 13, wherein the reception and transmission switchover parameters are associated with PacketCable protocol.

20. The communication system according to claim 13, wherein the switchover parameters comprise one or more of: packet time stamp, packet sequence number, rollover counter and RTCP index.

21. The communication system according to claim 13, wherein the switchover parameters comprise one or more of: packet time stamp, Nwrap and RTCP sequence number.

22. The communication system according to claim 13, wherein the redundant network media device backs-up a plurality of primary network media devices.

23. The communication system according to claim 22, further comprising a central network device to which switchover parameters are copied from each primary network media device, wherein said central network device is adapted to copy switchover parameters associated with a failing primary network media device to the redundant network media device.

24. The communication system according to claim 23, wherein the central network device comprises a storage array for storing switchover parameters associated with the respective primary network media devices.

25. A primary network media device adapted to maintain a secondary network media device used as a redundant network media device substantially at a similar encryption state, wherein reception and transmission switchover parameters are copied from the primary network media device to the redundant network media device, wherein the primary network media device utilizes a packet sequence number that is calculated based on an initial randomly-selected sequence number, wherein the primary network media device is to maintain the primary and secondary network media devices at a substantially similar encryption state by: at pre-defined time intervals, updating by the primary network media device values of the switchover parameters stored in a storage array residing within the secondary network media device;

wherein the secondary network media device is to perform switching from the primary network media device to the secondary network media device by (a) estimating current values of transmission switchover parameters, and (b) calculating current values of reception switchover parameters, wherein, based on last-known values of the switchover parameters, current values of said transmission switchover parameters are estimated;

wherein the estimation comprises estimation of: a transmitted Real-Time Transport Protocol (RTP) time stamp, a transmitted RTP sequence number, a transmitted Rollover Counter (ROC), and a transmitted Real-Time Control Protocol (RTCP) index;

wherein the estimation comprises an estimation for re-synchronization by a security protocol based on the estimated current values of said switchover parameters using a mechanism corresponding to recovery from network packet loss.

26. The primary network device according to claim 25, wherein the primary network media device is to determine whether or not $2^X$ packets have been communicated; and if it is determined that $2^X$ packets have been communicated, then the primary network media device is to update values of the switchover parameters stored in the storage array residing within the secondary network media device.

27. The primary network media device according to claim 26, wherein X=13.

28. The primary network media device according to claim 25, wherein the reception and transmission switchover parameters are associated with Secure Real-time Transport Protocol.

29. The primary network media device according to claim 25, wherein the reception and transmission switchover parameters are associated with PacketCable protocol.

30. The primary network media device according to claim 25, wherein the switchover parameters comprise one or more of: packet time stamp, packet sequence number, rollover counter and RTCP index.

31. The primary network media device according to claim 25, wherein the switchover parameters comprise one or more of: packet time stamp, Nwrap and RTCP sequence number.

32. The primary network media device according to claim 25, wherein the redundant network media device and the primary network media device are associated with a central network device to which the primary network media device copies switchover parameters, wherein said central network device is adapted to copy said switchover parameters to the redundant network media device if said primary network media device fails to provide service.

33. A redundant network media device adapted to be maintained substantially at a similar encryption state as a primary network media device, wherein reception and transmission switchover parameters are copied from the primary network media device to the redundant network media device, wherein the redundant network media device utilizes a packet sequence number that is calculated based on an initial randomly-selected sequence number, wherein the primary network media device is to maintain the primary and secondary network media devices at a substantially similar encryption state by: at pre-defined time intervals, updating by the primary network media device values of the switchover parameters stored in a storage array residing within the secondary network media device;

wherein the secondary network media device is to perform switching from the primary network media device to the secondary network media device by (a) estimating current values of transmission switchover parameters, and (b) calculating current values of reception switchover parameters, wherein, based on last-known values of the switchover parameters, current values of said transmission switchover parameters are estimated;

wherein the estimation comprises estimation of: a transmitted Real-Time Transport Protocol (RTP) time stamp, a transmitted RTP sequence number, a transmitted Rollover Counter (ROC), and a transmitted Real-Time Control Protocol (RTCP) index;

wherein the estimation comprises an estimation for re-synchronization by a security protocol based on the estimated current values of said switchover parameters using a mechanism corresponding to recovery from network packet loss.

34. The redundant network media device according to claim 33, wherein the primary network media device is to determine whether or not $2^X$ packets have been communicated; and if it is determined that $2^X$ packets have been communicated, then the primary network media device is to update values of the switchover parameters stored in the storage array residing within the secondary network media device.

35. The redundant network media device according to claim 34, wherein X=13.

36. The redundant network media device according to claim 33, wherein said redundant network media device receives packets by utilizing copied reception switchover parameters.

37. The redundant network media device according to claim 33, wherein said redundant network media device transmits packets by estimating current transmission switchover parameters.

38. The redundant network media device according to claim 33, wherein the redundant network media device estimates the current transmission switchover parameters based on copied transmission switchover parameters.

39. The redundant network media device according to claim 33, wherein the reception and transmission switchover parameters are associated with Secure Real-time Transport Protocol.

40. The redundant network media device according to claim 33, wherein the reception and transmission switchover parameters are associated with PacketCable protocol.

41. The redundant network media device according to claim 33, wherein the switchover parameters comprise one or more of: packet time stamp, packet sequence number, rollover counter and RTCP index.

42. The redundant network media device according to claim 33, wherein the switchover parameters comprise one or more of: packet time stamp, Nwrap and RTCP sequence number.

43. The redundant network media device according to claim 33, wherein the redundant network media device is adapted to back up a plurality of primary network media devices.

44. The redundant network, media device according to claim 43, wherein the redundant network media device and the primary network media device are associated with a central network device to which switchover parameters are copied from a primary network media device, wherein said central network device is adapted to copy switchover parameters associated with a failing primary network media device to the redundant network media device.

* * * * *